(12) United States Patent
Adcock

(10) Patent No.: US 10,158,126 B2
(45) Date of Patent: Dec. 18, 2018

(54) CONNECTOR SYSTEM FOR A FUEL CELL STACK ASSEMBLY

(71) Applicant: Intelligent Energy Limited, Loughborough (GB)

(72) Inventor: Paul Leonard Adcock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 235 days.

(21) Appl. No.: 15/102,794

(22) PCT Filed: Dec. 16, 2014

(86) PCT No.: PCT/GB2014/053716
§ 371 (c)(1),
(2) Date: Jun. 8, 2016

(87) PCT Pub. No.: WO2015/092381
PCT Pub. Date: Jun. 25, 2015

(65) Prior Publication Data
US 2017/0040622 A1    Feb. 9, 2017

(30) Foreign Application Priority Data
Dec. 18, 2013 (GB) .................................. 1322428.2

(51) Int. Cl.
*H01M 8/02* (2016.01)
*H01M 2/20* (2006.01)
(Continued)

(52) U.S. Cl.
CPC ........... *H01M 8/0269* (2013.01); *H01M 2/20* (2013.01); *H01M 2/202* (2013.01); *H01M 2/30* (2013.01);
(Continued)

(58) Field of Classification Search
None
See application file for complete search history.

(56) References Cited

U.S. PATENT DOCUMENTS 7,598,685 B1 * 10/2009 Shteynberg ........ H05B 33/0818
315/224
2001/0043050 A1 * 11/2001 Fisher, Jr. ............. H02J 7/0068
320/101
(Continued)

FOREIGN PATENT DOCUMENTS

CN   102668205 A   9/2012
CN   103299466 A   9/2013
(Continued)

OTHER PUBLICATIONS

DE-102005015205-A1 English machine translation (Year: 2006).*
(Continued)

*Primary Examiner* — Scott J. Chmielecki
(74) *Attorney, Agent, or Firm* — Baker & Hostetler LLP

(57) ABSTRACT

A fuel cell stack assembly comprises fuel cells disposed in a stacked configuration, each cell substantially parallel to an x-y plane and including a tab extending laterally from an edge of a plate in the cell in the x-direction to form an array of tabs extending along a side face of the fuel cell stack in a z-direction orthogonal to the x-y plane. A connector engages with the tabs of the fuel cell stack. The connector comprises a support region and engagement regions, each engagement region bounded by the support region and configured to receive one of the array of tabs by engagement in the x-direction. The connector has flexible conductors, each of the flexible conductors laterally extending from the support region over at least a portion of one of the engagement regions and configured to be deflected away from the support region by a received tab.

19 Claims, 5 Drawing Sheets

(51) Int. Cl.
  *H01M 2/30*  (2006.01)
  *H01M 8/0202* (2016.01)
  *H01M 8/2465* (2016.01)
  *H01M 8/00*   (2016.01)
  *H01M 8/04537* (2016.01)
  *H01M 2/06*   (2006.01)

(52) U.S. Cl.
  CPC ............ *H01M 8/006* (2013.01); *H01M 8/02* (2013.01); *H01M 8/04559* (2013.01); *H01M 8/2465* (2013.01); *H01M 2/06* (2013.01)

(56) References Cited

U.S. PATENT DOCUMENTS

| | | | |
|---|---|---|---|
| 2002/0164517 A1 | 11/2002 | Sato et al. | |
| 2003/0215678 A1 | 11/2003 | Barton et al. | |
| 2005/0186456 A1* | 8/2005 | Andreas-Schott | H01M 8/0247 429/432 |
| 2006/0035128 A1 | 2/2006 | Draper et al. | |
| 2010/0190077 A1* | 7/2010 | Shimura | H01M 8/0444 429/443 |
| 2011/0034089 A1* | 2/2011 | Nagashima | B29C 45/14065 439/736 |
| 2012/0083171 A1* | 4/2012 | Byrne | H01R 4/48 439/888 |
| 2012/0252283 A1* | 10/2012 | Muro | H01R 13/113 439/839 |
| 2012/0315805 A1* | 12/2012 | Byrne | H01R 13/112 439/850 |
| 2014/0273659 A1* | 9/2014 | Glick | H01R 13/113 439/676 |

FOREIGN PATENT DOCUMENTS

| | | | |
|---|---|---|---|
| DE | 102005015205 | 10/2006 | |
| DE | 102005015205 A1 * | 10/2006 | ............ H01R 11/01 |
| DE | 102005015205 A1 | 10/2006 | |
| JP | 2011091730 A * | 5/2011 | |
| JP | 5472709 B2 * | 4/2014 | |
| WO | WO 2012/073000 A1 | 6/2012 | |
| WO | WO 2013/064645 A1 | 5/2013 | |

OTHER PUBLICATIONS

International Search Report and Written Opinion dated Mar. 31, 2015, in International Application No. PCT/GB2014/053716.
Great Britain Patent Application No. 1322428.2; Search Report; dated Jun. 19, 2014; 6 pages.
International Patent Application No. PCT/GB2014/053716; Int'l Preliminary Report on Patentability; dated Jun. 21, 2016; 8 pages.

* cited by examiner

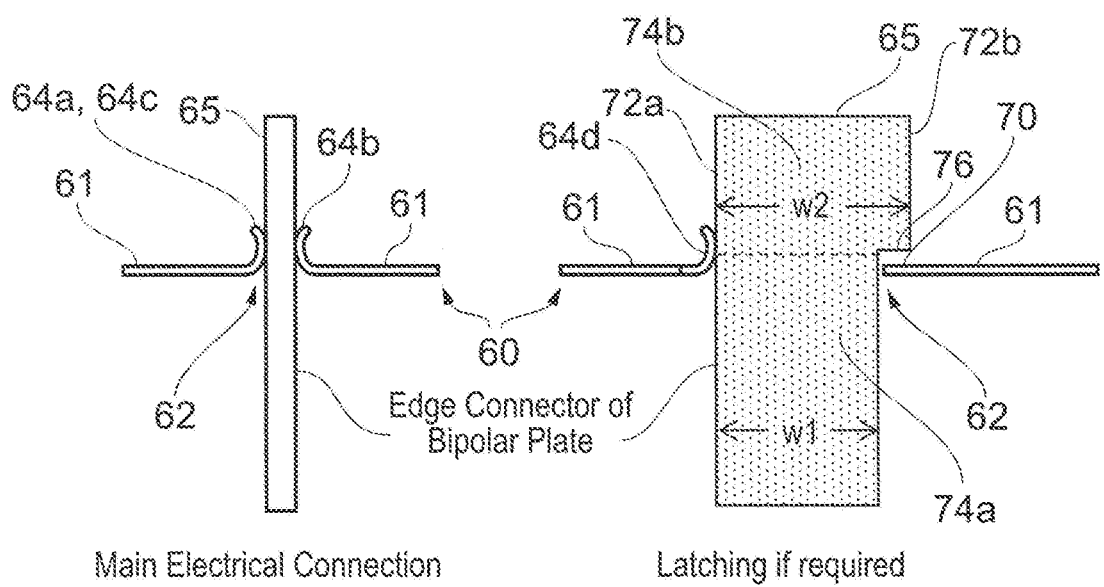
Main Electrical Connection    Latching if required
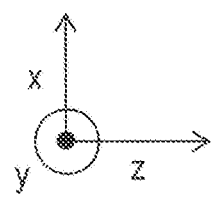
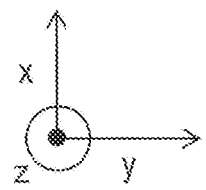
FIG. 6a                FIG. 6b

CONNECTOR SYSTEM FOR A FUEL CELL STACK ASSEMBLY

CROSS-REFERENCE TO RELATED APPLICATIONS

This patent application is a U.S. National Stage Patent Application of International Patent Application PCT/GB2014/053716 filed Dec. 16, 2014, which claims priority to Great Britain Patent Application GB1322428.2 filed Dec. 18, 2013, the disclosures of which are incorporated by reference in their entirety.

The present invention relates to electrical connector systems used in fuel cell stacks to make electrical connections to a plurality of individual cells within the fuel cell stack.

Conventional electrochemical fuel cells convert fuel and oxidant into electrical energy and a reaction product. A typical fuel cell comprises a membrane-electrode assembly (MEA) sandwiched between an anode flow field plate and a cathode flow field plate. The flow field plates typically include one or more channels extending over the surface of the plate adjacent to the MEA for delivery of fluid fuel or oxidant to the active surface of the MEA. The flow field plates also perform the function of providing an electrical contact to the MEA across the surface thereof.

In a conventional fuel cell stack, a plurality of cells are stacked together, so that the anode flow field plate of one cell is adjacent to the cathode flow field plate of the next cell in the stack, and so on. In some arrangements, bipolar flow plates are used so that a single flow field plate has fluid flow channels in both sides of the plate. One side of the bipolar plate serves as an anode flow plate for a first cell and the other side of the flow plate serves as a cathode flow plate for the adjacent cell. Power can be extracted from the stack by electrical connections made to the first and last flow plate in the stack. A typical stack may comprise many tens or even hundreds of cells.

In many fuel cell stacks, it is important to be able to monitor the voltage of individual cells in the stack. Thus, it is necessary to provide electrical connector tabs to many of the flow plates in the stack. These cell voltage monitoring tabs extend, in the planes of the plates, laterally outward from the stack thereby forming an array of tabs along an edge face of the stack, so that individual electrical connectors may be coupled to each tab.

In an effort to reduce the size and weight of fuel cell stacks, and thus increase the power density of a fuel cell stack, there has been a trend towards ever thinner flow plates, which may be formed from thin sheets of electrically conductive metal or foil that are corrugated to form the requisite channels in each face of the flow plate. This can substantially reduce the size and weight of the fuel cell stack, but creates a potential difficulty in the formation of cell voltage monitoring tabs extending laterally from edges of the flow plates. A typical thickness of flow plates has hitherto been reduced to approximately 0.6 mm, which causes few problems and individual cell voltage monitoring connectors have been used. However, proposals for further reductions in flow plate thickness, for example down to 0.1 mm, can cause significant difficulties for conventional electrical connectors. Similarly, very large numbers of cell voltage monitoring tabs (e.g. in excess of several hundred) on a single fuel cell stack makes connection thereto a labour intensive and difficult operation.

The decreasing thickness of the flow plates means that the individual tabs extending therefrom may no longer have the requisite stiffness or structural integrity to resist the necessary compressive force asserted by a conventional push-fit spring-loaded or friction-fit female connector which is applied to each tab from the ends of the tabs distal to the fuel cell stack. It may therefore be beneficial to provide a connector with a low insertion force for the tabs of the array.

Another problem is that the tabs generally do not form a perfect array in which every tab is fully aligned with, and equally spaced from, the adjacent tabs. This is due to normal manufacturing and assembly tolerances when assembling the fuel cell stack and this can provide an additional difficulty in aligning the tabs if it is desired to use a multi-tab connector.

According to one aspect, the present invention provides a fuel cell stack assembly comprising:
   fuel cells disposed in a stacked configuration, each cell substantially parallel to an x-y plane and including a tab extending laterally from an edge of a plate in the cell in the x-direction to form an array of tabs extending along a side face of the fuel cell stack in a z-direction orthogonal to the x-y plane; and
   a connector for engaging with tabs of the fuel cell stack, the connector comprising:
   a support region;
   engagement regions, each engagement region bounded by the support region and configured to receive one of the array of tabs by engagement in the x-direction; and
   flexible conductors, each of the flexible conductors laterally extending from the support region over at least a portion of one of the engagement regions and configured to be deflected away from the support region by a received tab.

The flexible conductors may be configured to be deflected in the x-direction away from the support region by the received tab. Each engagement region may be provided by a separate aperture in the support region. Each engagement region may be configured to receive one of the array of tabs through the aperture in the x-direction. Each flexible conductor may be configured to make electrical contact with the received tab when deflected by the tab. The support region may extend in a y-z plane. The support region may comprise a conductive layer in electrical contact with the flexible conductors. The conductive layer of the support region and the flexible conductors may comprise a single layer. The fuel cell stack assembly may comprise an electrical socket or plug on the connector that is electrically coupled to the flexible conductors. The fuel cell stack assembly may further comprise resistors each electrically coupled between the socket or plug and at least one of the flexible conductors. Each of the engagement regions may be associated with a different resistor. The support region may be stiffer than the flexible conductor. The support region may surround each of the engagement regions. The fuel cell stack assembly may further comprise rigid conductors on the support region that are each associated with one of the engagement regions. The tabs may each comprise a latch configured to engage with a respective rigid conductor in order to inhibit disengagement of the tab from the connector.

According to a further aspect, the present invention provides a connector for engaging with an array of tabs of a fuel cell stack, the connector comprising:
   a planar substrate defining a plurality of apertures therein each configured to receive one of the array of tabs;
   flexible conductors each extending into one of the apertures in the plane of the substrate and configured to be deflected out of the plane of the substrate by, and engage with, a tab that is received into the aperture.

The connector may be used in a fuel cell system or any other system in order to provide electrical connections to the tabs. The planar substrate may comprise a printed circuit board and the flexible conductors may each comprise an electrically conductive layer coupled to the printed circuit board, the flexible conductors each being more flexible than the printed circuit board.

Embodiments of the invention will now be described by way of example and with reference to the accompanying drawings in which:

FIG. 6a illustrates a cross-sectional view of the connector of FIG. 5; and

FIG. 6b illustrates an orthogonal cross-sectional view of the connector of FIG. 6a.

Figure 1:
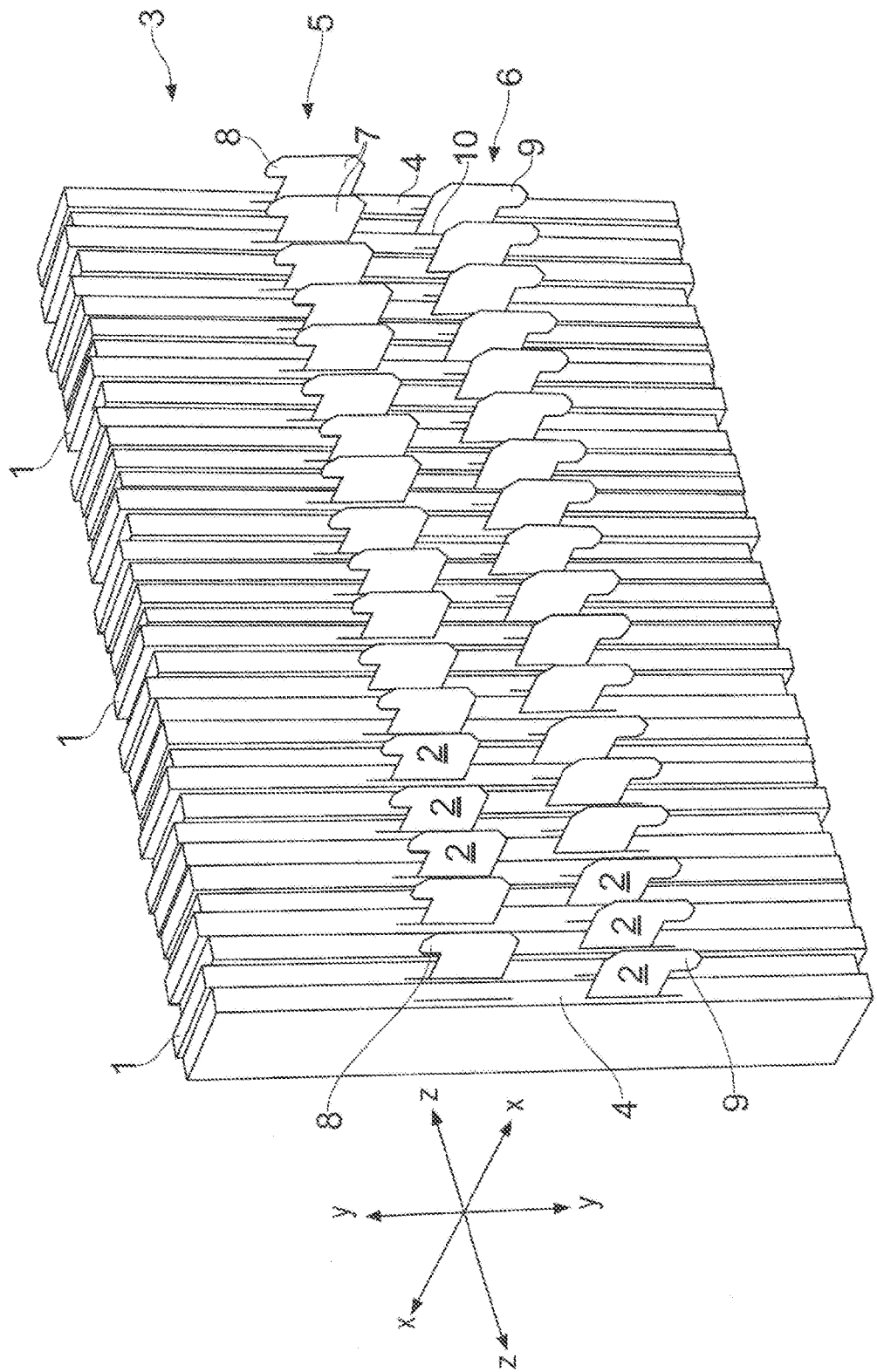
FIG. 1 is a perspective view of a portion of a side face of a fuel cell stack with an array of cell voltage monitoring electrical connection tabs extending out of the side face from each cell.

Throughout the present specification, the descriptors relating to relative orientation and position, such as "top", "bottom", "left", "right", "up", "down", "front", "back", as well as any adjective and adverb derivatives thereof, are used in the sense of the orientation of fuel cell stack as presented in the drawings. However, such descriptors are not intended to be in any way limiting to an intended use of the described or claimed invention.

With reference to FIG. 1, a fuel cell stack includes a number of cells 1 in a stacked configuration. Only a relevant edge of the cells in the stack is shown. Each cell 1 includes a number of components such as a membrane-electrode assembly, electrode diffuser materials and sealing gaskets sandwiched between fluid flow plates as well known in the art and not described further here. Each cell 1 is a generally planar structure occupying an x-y plane. As shown in FIG. 1, the x-axis extends into/out of the plane of the paper, while the y-axis extends in the vertical direction. The z-axis extends left to right. However, no limitation on the stack is implied by any particular choice of orientation of orthogonal x-y-z axes.

Each bipolar flow plate in the stack includes a cell voltage monitoring electrical connection tab 2 extending in the x-direction from a side face 3 of the fuel cell stack. The expression 'tab' is intended to encompass any suitable electrical conductor extending outward from the side face 3 of the fuel cell stack and providing electrical conduction to an electrode of a cell 1 in the fuel cell stack. Each tab 2 emerges from an edge 4 of a respective cell 1, e.g. through a pair of gasket seals (not shown). The plurality of tabs 2 form an array, and in the embodiment shown the array is a two-dimensional array in which a first row 5 of tabs 2 is separated in the y-direction from a second row 6 of tabs 2. The second row 6 of tabs 2 is also offset from the first row 5 of tabs 2 in the z-direction. This enables alternating ones of the bipolar plates in the stack to be connected via cell voltage monitoring tabs 2 in each row 5, 6 of the array, such that the density of tabs in the z-direction can be substantially reduced, in this case by half.

It will be understood that the number of rows 5, 6 in the array of tabs 2 can be one, two or more. The tabs 2 can be provided for every cell in the stack or for less than every cell in the stack. The tabs 2 may correspond to each bipolar plate as described in this example or, if separate cathode flow plates and anode flow plates are used in the stack, the tabs 2 may be provided for one or both of each of the cathode and anode flow plates.

Each tab 2 is preferably formed as an integral part of the plate, for example pressed or stamped out of a sheet at the same time as the plate. The tabs 2 may be crimped, e.g. curved around the x-axis to provide additional stiffness against bending in the z-direction. Tabs 2 may be formed in multiple places on one or more edges of the plates.

As shown in FIG. 1, each tab 2 may be formed with a hook 8, 9 at the distal end 7 of the tab 2 (the distal end being the end remote from the body of the plate). The hooks 8, 9 each extend in the y-direction, i.e. parallel with the side face 3 of the stack. The hooks 8 in the first row 5 may extend in the positive y-direction while the hooks 9 in the second row 6 may extend in the opposite, i.e. negative, y-direction such that the hooks all face outwardly. Because of manufacturing tolerances, each plate in the stack, and therefore each tab 2 in the array, may be shifted slightly from a precisely regular array position, as shown exaggerated in the drawing. A typical scatter of components may arise from positional tolerances of ±0.2 mm. The thickness of the tabs 2 may be as low as 0.1 mm or thinner.

Figure 2A:
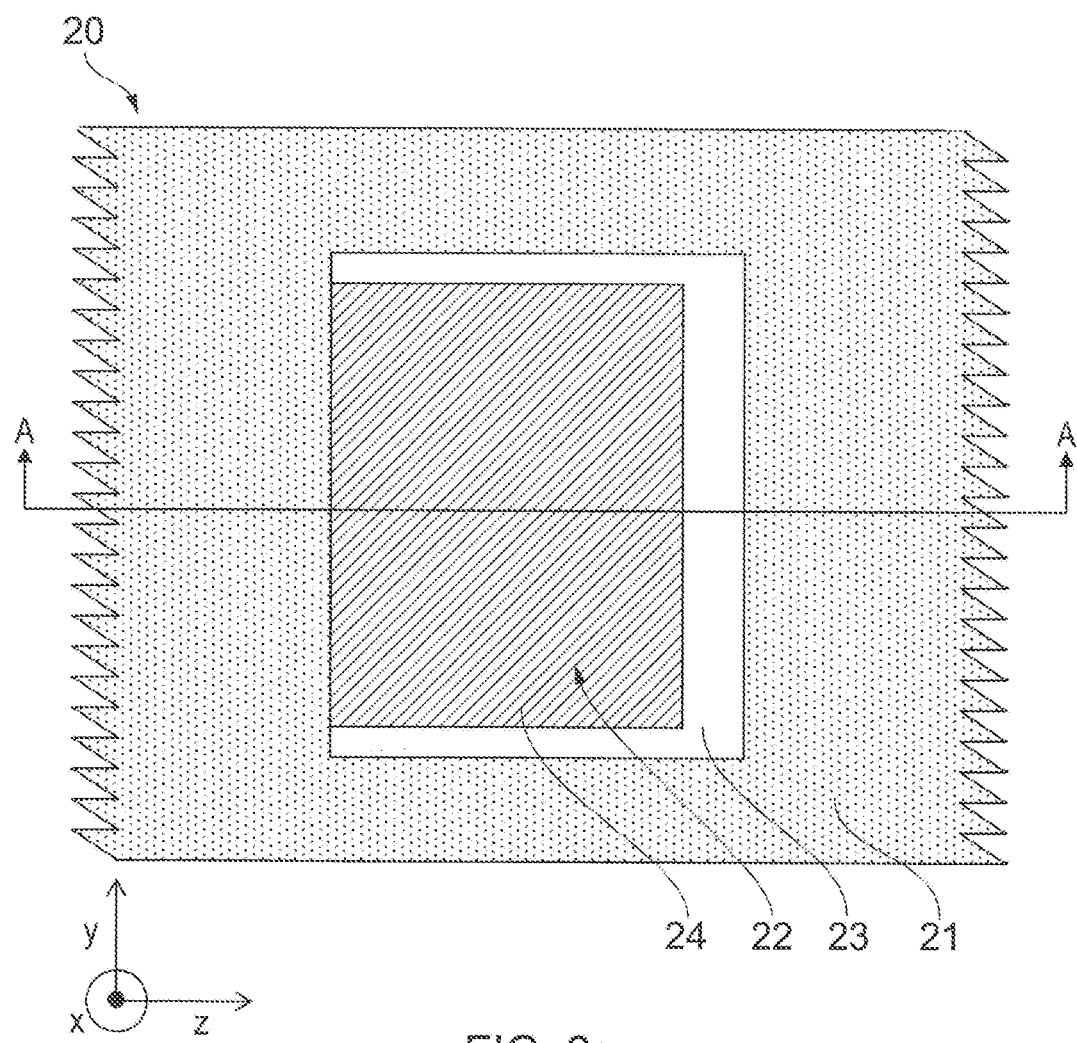
FIG. 2a is a schematic face view of a portion of a connector for engaging with tabs of a fuel cell stack.
Figure 2B:
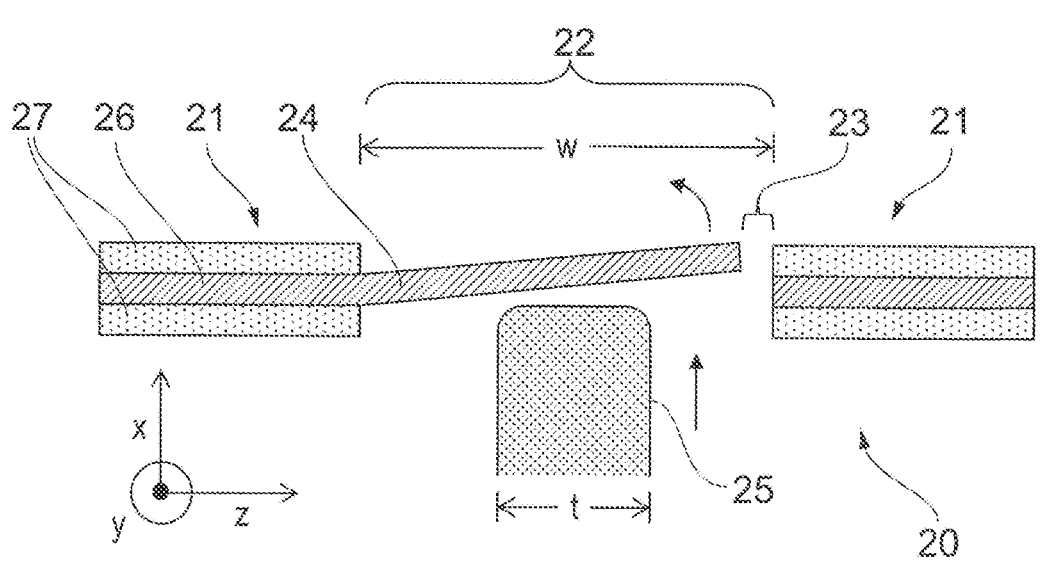
FIG. 2b is a cross-sectional view on line A-A of the connector of FIG. 2a shown partially engaging with a tab of the fuel cell stack of FIG. 1.

FIGS. 2a and 2b illustrate a portion of a connector system (which may be referred to simply as a connector 20) for engaging with tabs of a fuel cell stack. The connector 20 extends in the y-z plane normal to the x-direction as defined in relation to the fuel cell stack of FIG. 1.

FIG. 2a illustrates a front face view of the y-z plane of a portion of the connector 20. The connector 20 comprises a support region 21 (which may also be referred to as a substrate), an engagement region 22 (which may take the form of an aperture in the substrate), a flexible conductor 24 extending into the aperture, and a gap 23 between the flexible conductor and the substrate. Only a single engagement region 22 and flexible conductor 24 are shown in the portion of the connector 20 illustrated in FIG. 2a but there may be others as discussed in connection with FIGS. 3 to 5.

The support region 21 extends in a y-z plane. The support region 21 can be provided by a printed circuit board (PCB). The support region 21 is preferably rigid.

The engagement region 22 is configured to receive a tab 2 of a fuel cell. The engagement region 22 is provided by an aperture in the support region 21 and so is bounded by the support region 21. In the example shown in FIG. 2a, the support region 21 entirely surrounds the aperture of the engagement region 22 but in another example, the engagement region 22 could be bounded on fewer sides (e.g. three) by the support region 21.

FIG. 2b illustrates a schematic cross-sectional view in the x-z plane of a portion of the connector 20 as it is about to engage with a tab 25 of a fuel cell stack. The aperture of the engagement region 22 is configured to receive the tab 25 of the fuel cell by engagement in the x-direction, normal to the y-z plane. That is, the tab 25 may be inserted into, or through, the aperture of the engagement region 22 in a simple push-fit arrangement. To do this, the connector 20 is pressed, in the x-direction, towards the face 3 of the fuel cell stack. The connector 20 may be retained in position against the face 3 of the fuel cell stack using any appropriate retaining mechanism.

The aperture can be formed by any suitable process, such as water, laser or die cutting. A width, w, of the aperture of the engagement region 22 may be substantially wider (in the y or z direction) than a corresponding thickness, t, of the tab 25. Providing an engagement region 22 that is a factor of two or three times wider than the tab 25 can reduce the tolerance of fit requirements in the y-z plane for the connector 20. This can avoid the possibility of damage to the tab 25 by contact with the support region 21 due to tolerance errors in an array of tabs on the fuel cell stack. In such examples, tabs of the fuel cell may not need to be crimped for extra strength, so reducing manufacturing complexity.

The flexible conductor 24 extends laterally in the y-z plane from the support region 21. The flexible conductor 24 extends over at least a portion of the engagement region 22 when the connector 20 is not engaged with tabs 25 of the fuel cell stack. Where the flexible conductor 24 only extends over a portion of the engagement region 22, a gap 23 is present between the flexible conductor 24 and one or more edges of the engagement region 22.

The flexible conductor 24 is configured to be deflected from the support region by the received tab 25. For example, the flexible conductor 24 is deflected out of the plane of the substrate or support region 21. A force exerted on the flexible conductor 24 by the tab 25 may cause deformation of the flexible conductor 24. In the example shown, this deformation is manifested as a bending of the flexible conductor 24 adjacent to where the flexible conductor 24 borders the support region 21. The flexible conductor 24 may comprise a material that is resiliently flexible so that it resiliently returns to the plane of the support region 21 when the tab 25 is disengaged from the flexible conductor 24. Alternatively, the deformation of the flexible conductor 24 caused by the engagement of the tab 25 may be plastic.

The provision of a flexible conductor 24 to engage with the tab 25 ensures that any mechanical deformation of the tab 25 by engagement with the connector 20 is minimised, or at least reduced thereby avoiding damage to the tab. This allows repeated attachment and detachment of the tab 25 and the engagement region 22. However, the tab 25 may be configured to distort or flex when in contact with the flexible conductor in order to ensure a good electrical connection. The distortion is preferably an elastic deformation so that operation of the connector is reversible and re-engageable.

The support region 21 comprises a conductive layer 26 affixed to a support layer 27. There may be multiple support layers 27 as shown in FIG. 2b. The conductive layer 26 is in electrical contact with the flexible conductor 24 and enables connection between the flexible conductor 24 and external components. The support layer 27 provides rigidity to the support region 26.

The conductive layer 26 and the flexible conductor 24 may be unitary, e.g. provided by the same layer or layered structure comprising one or more layers of material which lie in the y-z plane when the tab 25 is not engaged. Thus, the conductive layer 26 of the support region 21 and the flexible conductor 24 may be integrally formed so that the flexible conductor 24 is an extension of the same material layer or layers of the conductive layer 26 into the engagement region 22.

The conductive layer 26 can form electrically conductive tracks, such as the tracks on a printed circuit board (PCB) or flexi-PCB, for example. The flexible conductor 24 may be provided as a conductive region on a flexi-PCB. Other suitable materials for the conductive layer 26 and/or flexible conductor 24 include metal films and carbon sheets or polyamide with a suitable conductive film thereon, such as copper, nickel or gold. Alternatively, the flexible conductor 24 can be provided by a more rigid material or structure, such as a metal sheet, rather than a metal film. In this case, the flexibility of the flexible conductor 24 may be provided by the manner of its mechanical engagement with the conductive layer 26. For example, a hinge or region of relative weakness or higher flexibility may be provided between the flexible conductor 24 and the conductive layer 26.

The support layer 27 may be provided by a material that is stiffer than the flexible conductor 24 or conductive layer 26. The support layer 27 may be provided by a dielectric layer of a PCB. The support layer 27 may be provided by materials such as Teflon, FR-4, FR-1, CEM-1 or CEM-3, which are commonly used in PCB manufacture. The support layer 27 may be provided on either side of the conductive layer 26, or both in the sandwich arrangement illustrated in FIG. 2b. In general, the combined structure of the support region 21 and the engagement region 22 of connector 20 may be formed using recently developed rigid-flex/flexi-rigid PCB techniques, where flexible and rigid substrates are laminated together to form printed circuit boards having regions of flexibility and stiffer regions of rigid regions.

Similar features illustrated in FIGS. 2 to 6 will be represented with corresponding reference numerals and will not necessarily be described in detail with regard to subsequent figures.

Figure 3:
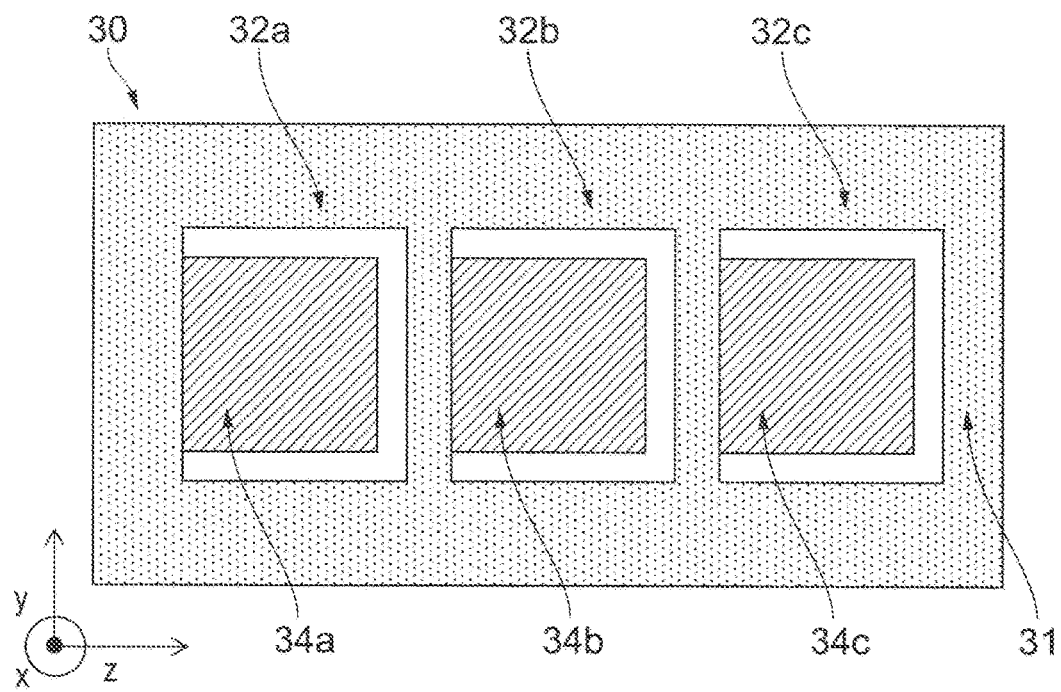
FIG. 3 is a schematic face view of the connector of FIG. 2a showing a plurality of engagement regions.

FIG. 3 illustrates a front face view of the y-z plane of a connector 30 showing a plurality of engagement regions 32a, 32b, 32c each similar to the engagement region illustrated in FIG. 2a. In this example, each engagement region 32a, 32b, 32c provides a single flexible conductor 34a, 34b, 34c.

The support region 31 is a continuous support region bounding each of the engagement regions 32a, 32b, 32c. Each engagement region provides for connection to a respective tab 2, 25.

The engagement regions 32a, 32b, 32c are provided as an array that extends in the z-direction in which each aligns with a tab 2 of a fuel cell stack. Although only three engagement regions are shown, the array may contain many engagement regions corresponding to a number of tabs 2. The connector 30 may be configured to engage with the tabs of the fuel cell stack in FIG. 1 by providing two rows that each extend in the z-direction and are mutually spaced apart in the y-direction. Each array would need to comprise 18 engagement regions in order to engage each of the tabs of the fuel cell of FIG. 1.

By using a connector 30 that couples to many tabs at once, assembly costs can be significantly reduced, as can assembly errors. Risks of shorting between adjacent tabs may also be reduced by the provision of such a connector 30 as insulation may be provided by the support region 31 between each tab.

The low insertion force required for engagement of tabs with the connector 30 makes the connector 30 suitable for easy removal and reconnection without damage to the tabs. The connector 30 can readily be made modular in nature. The use of a PCB planar support region 31 enables a connector 30 to be made at a low cost whilst being easily integratable with other components of a fuel cell system. The connector assembly 30 can be used for both etched and pressed fuel cell field plates and separator plates.

Figure 4:
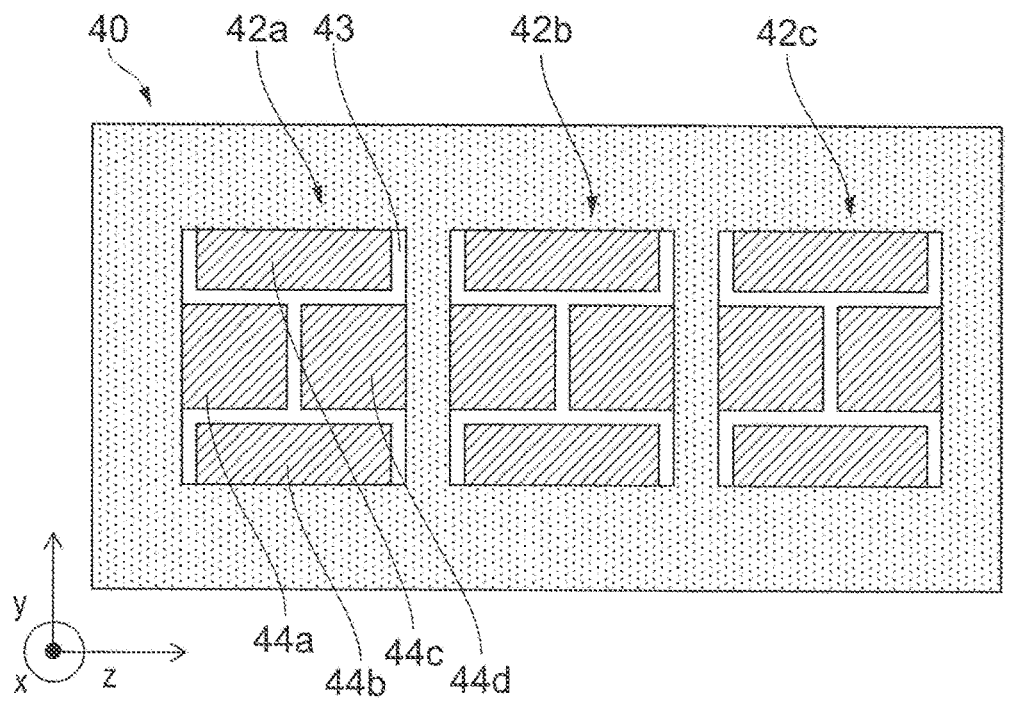
FIG. 4 is a schematic face view of another connector that comprises a plurality of engagement regions, each engagement region comprising a plurality of flexible conductors.

FIG. 4 illustrates a front face view of the y-z plane of another connector 40 which comprises a plurality of engagement regions 42a, 42b, 42c. Each engagement region 42a, 42b, 42c comprises a plurality of flexible conductors 44a, 44b, 44c, 44d each separately deflectable by a tab 2, 25. Each of the plurality of flexible conductors 44a, 44b, 44c, 44d associated with the first engagement region 42a is separated from the other flexible conductors 44a, 44b, 44c, 44d of the first engagement region 42a by a gap 43 (an uncovered portion of the aperture of the engagement region 42a).

The engagement regions 42a, 42b, 42c in this example are rectangular. Each of the flexible conductors 44a, 44b, 44c, 44d of the first engagement region 42a extends from a different side of the first engagement regions 42a. In this way, a tab that is inserted into the engagement region 42a in the x-direction will deflect at least some, and preferably all, of the flexible conductors 44a, 44b, 44c, 44d away from the y-z plane of the support region.

Figure 5:
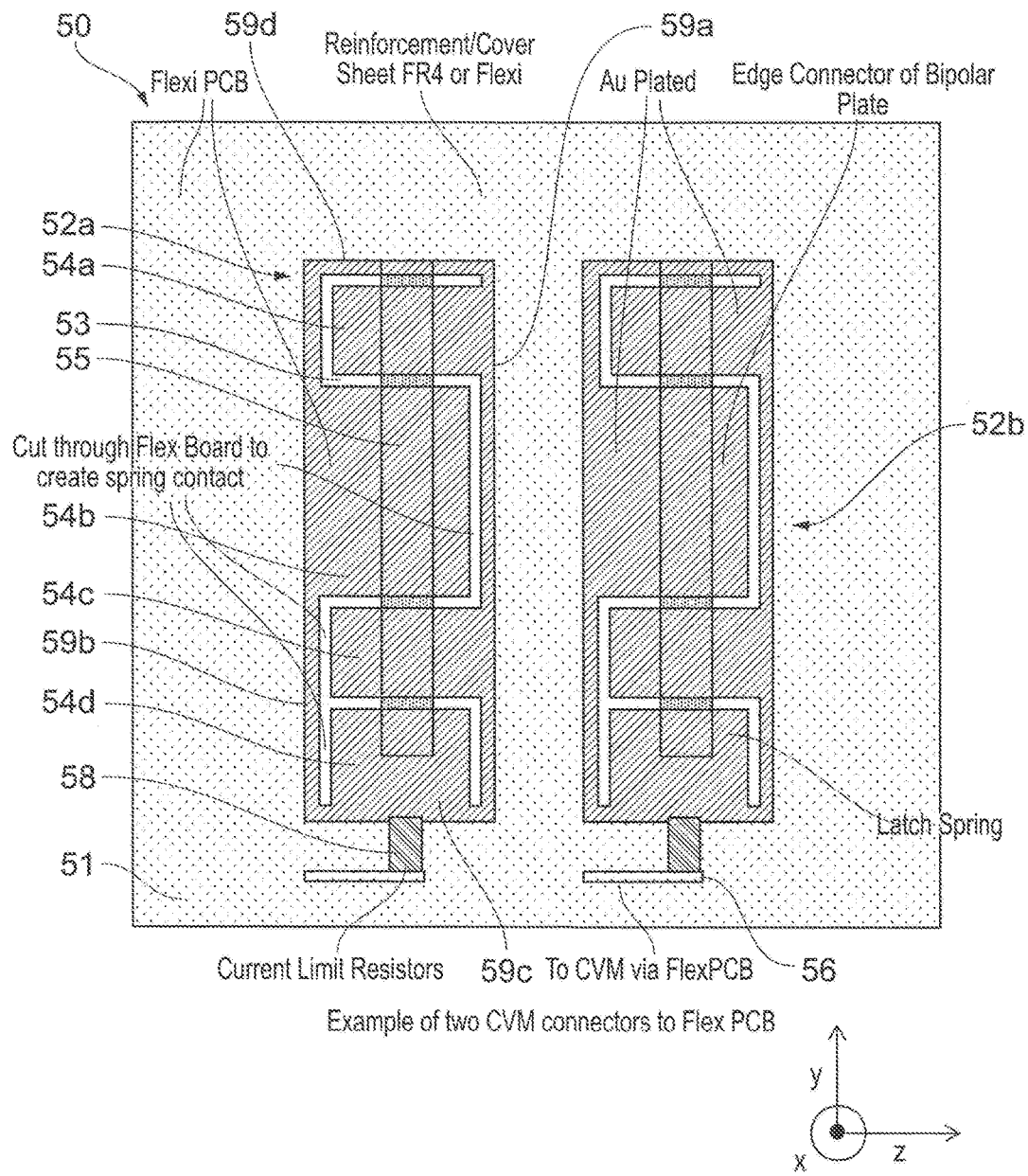
FIG. 5 illustrates a schematic face view of another connector that comprises a plurality of engagement regions, each engagement region comprising a plurality of flexible conductors and having a common connection point.

FIG. 5 illustrates a front face view of the y-z plane of another connector 50 that comprises a plurality of engagement regions 52a, 52b. The outline of a tab 55 below the engagement regions 52a, 52b is illustrated in FIG. 5. Each engagement region 52a, 52b comprises a plurality of flexible conductors 54a-54d that have a common connection point. These features will be discussed in further detail below with reference to a first of the engagement regions 52a by way of example.

The first engagement region 52a is broadly rectangular and has a first side 59a, an opposing second side 59b, a third side 59c that extends between the first and second side 59a, 59b and a fourth side 59d that opposes the third side 59c. The first engagement region 52a comprises a first flexible conductor 54a, a second flexible conductor 54b, a third flexible conductor 54c and a fourth flexible conductor 54d. The flexible conductors 54a, 54b, 54c, 54d can be considered to define a plurality of flaps that each extend into the engagement region 52a.

The flexible conductors 54a, 54b, 54c, 54d are connected to one another by peripheral flexible material that extends around a periphery of the first engagement region 52a. The flexible conductors are also broadly rectangular and each has a side that extends from one of the sides 59a, 59b, 59c, 59d of the first engagement region 52a. A gap 53 extends between each of the adjacent flexible conductors 54a, 54b, 54c, 54d.

The first and third flexible conductors 54a, 54c both extend from the first side 59a of the first engagement region 52a towards the opposing second side 59b and are connected by a portion of the peripheral flexible material.

The second flexible conductor 54b is interleaved between the first and third flexible conductors 54a, 54c and extends from the second side 59b towards the first side 59a of the first engagement region 52a. The second flexible conductor 54b is connected to the first flexible conductor 54a by a portion of the peripheral flexible material.

The fourth flexible conductor 54d extends from the third side 59c towards the fourth side 59d of the first engagement region 52a. The fourth flexible conductor 54d is connected to the second and third flexible conductors 54b, 54c by respective portions of peripheral flexible material.

An electrical socket, pin, blade, receptacle or plug 56 can be mounted on the support region 51 to form an external connection point. The socket, pin, blade or plug may be electrically coupled to each of the flexible conductors 54a, 54b, 54c, 54d. The connector 50 may include current-limiting resistors 58 that are each electrically coupled between the socket or plug and the flexible conductors of the engagement regions 52a, 52b. Each of the engagement regions 52a, 52b may be associated with a separate resistor 58. Each resistor 58 may be of the same resistance value or different resistance value, according to protection requirements. The resistors 58 may be configured to prevent current overload and/or reduce the risk of electrostatic discharge between the fuel cell connector and the connector 50 when establishing a connection, but still allow monitoring of the voltage of a cell. Cell voltage monitoring circuits may also be provided in-situ on the support region 51 of the connector 50, e.g. situated on the circuit board electrically between the resistors and the external connection points 56.

FIG. 6 illustrates two orthogonal cross sectional views of a portion of the connector of FIG. 5 and a tab 65. The tab 65 is an edge connector of a bipolar plate, such as the tabs 2 of the fuel cells in FIG. 1. FIG. 6a illustrates a side view through the x-z plane of the tab 65 and connector 60. FIG. 6b illustrates a side view through the x-y plane of the tab 65 and the connector 60.

The connector 60 comprises a support region 61 and an engagement region 62. The engagement region 62 is defined by an aperture in the support region 61. First, second and fourth flexible conductors 64a, 64b, 64d of the connector 60 are also visible in FIGS. 6a and 6b. The third flexible conductor 64c and the first flexible conductor 64a have a common profile in FIG. 6a. All of the flexible conductors 64a, 64b, 64d extend from the support region 61 over at least a portion of the engagement region 62.

In FIG. 6a, the first and second flexible conductors 64a, 64b can be seen in a deflected condition. The first and second flexible conductors 64a, 64b extend in the z-direction from opposing edges of the support region 61.

In FIG. 6b, the fourth flexible conductor 64d can be seen in a deflected condition. The fourth flexible conductor 64d extends in the y-direction from an edge of the support region 61 over a portion of the engagement region 62. A top surface (in the y-z plane) of the support region 61 adjacent to an opposing edge of the support region 61 provides a latching region 70 that can bear against the tab 65. The latching region 70 may be a rigid conductor that is configured to make electrical as well as mechanical contact with the tab 65.

The tab 65 has a flat edge 72a opposite a latching edge 72b. The latching edge 72b provides a latching face 76 that can bear against the latching region 70 of the support region 61. The tab 65 has a proximal portion 74a and a distal portion 74b with respect to the fuel cell stack. The distal portion 74b of the tab 65 has a greater width w2 in the y-direction than a width w1 of the proximal portion 74a thereby providing a step change in the width of the tab 65 to define the latching edge 72b.

The following steps take place during the engagement of the tab 65 and connector 60.

The tab 65 is inserted in the x-direction through the aperture in the support region 61 that defines the engagement region 62. The tab 65 is inserted such that the flat edge 72a lies adjacent to the third flexible conductor 64d and the latching edge 72b lies adjacent to the rigid conductor 70 side of the engagement region 62. The inserted tab 65 displaces and deflects the flexible conductors 64a, 64b, 64c, 64d in the x-direction away from the support region 61.

The connector 60 is then pushed in the y-direction with respect to the tab 65 so that the latching face 76 of the tab 65 faces the latching region 70. The fourth flexible conductors 64d may be configured to bias the tab 65 towards the latching region 70 in the y-direction. Once the latching face 76 is aligned with the latching region 70, the latching region 70 prevents removal of the tab 65 in the negative x-direction.

It will be appreciated that features described in relation to one example may be provided in addition to the features illustrated in any other example, unless an intention to the contrary is apparent.

Forming the connectors 20, 30, 40, 50, 60 as described with, on or incorporated within a printed circuit board provides easy integration of other components into the connector or connection to other components, and well as enabling use of existing convenient PCB manufacturing techniques. The use of deflectable flexible conductors extending into an array of apertures in the PCB in the plane of the PCB allows easy, low force insertion of all of the tabs of a fuel cell stack into the array of apertures for quick connection of all tabs. This can be particularly advantageous where a very large number of tab connectors (e.g. in excess of 300) on a fuel cell stack must be connected quickly and easily.

Other embodiments are intentionally within the scope of the accompanying claims.

The invention claimed is:

1. A fuel cell stack assembly comprising:
   fuel cells disposed in a stacked configuration, each cell substantially parallel to an x-y plane and including a tab extending laterally from an edge of a plate in the cell in the x-direction to form an array of tabs extending along a side face of the fuel cell stack in a z-direction orthogonal to the x-y plane; and,
   a connector for engaging with tabs of the fuel cell stack, the connector comprising:
   a support region;
   engagement regions, each engagement region bounded by the support region and configured to receive one of the array of tabs by engagement in the x-direction; and
   flexible conductors, each of the flexible conductors laterally extending from the support region over at least a portion of one of the engagement regions and configured to be deflected away from the support region by a received tab,
   wherein the flexible conductors are configured to be deflected in the x-direction away from the support region by the received tab.

2. The fuel cell stack assembly of claim 1, wherein each engagement region is provided by a separate aperture in the support region and wherein each engagement region is configured to receive one of the array of tabs through the aperture in the x-direction.

3. The fuel cell stack assembly of claim 1 wherein each flexible conductor is configured to make electrical contact with the received tab when deflected by the tab.

4. The fuel cell stack assembly of claim 1 wherein the support region extends in a y-z plane.

5. The fuel cell stack assembly of claim 1 wherein the support region comprises a conductive layer in electrical contact with the flexible conductors.

6. The fuel cell stack assembly of claim 5 wherein the conductive layer of the support region and the flexible conductors are integrally formed.

7. The fuel cell stack assembly of claim 1 further comprising an electrical socket or plug on the connector that is electrically coupled to the flexible conductors.

8. The fuel cell stack assembly of claim 7 further comprising resistors each electrically coupled between the socket or plug and at least one of the flexible conductors.

9. The fuel cell stack assembly of claim 8 wherein each of the engagement regions is associated with a different resistor.

10. The fuel cell stack assembly of claim 1 wherein the support region is stiffer than the flexible conductor.

11. The fuel cell stack assembly of claim 1 wherein the support region surrounds each of the engagement regions.

12. The fuel cell stack assembly of claim 1 further comprising rigid conductors on the support region that are each associated with one of the engagement regions.

13. The fuel cell stack assembly of claim 12 wherein the tabs each comprise a latch configured to engage with a respective rigid conductor in order to inhibit disengagement of the tab from the connector.

14. A connector for engaging with an array of tabs of a fuel cell stack, the connector comprising:
    a planar substrate defining a plurality of apertures therein each configured to receive one of the array of tabs;
    flexible conductors each extending into one of the apertures in the plane of the substrate and configured to be deflected out of the plane of the substrate by, and engage with, a tab that is received into the aperture; and,
    in which the planar substrate comprises a printed circuit board and the flexible conductors each comprise an electrically conductive layer coupled to the printed circuit board, the flexible conductors each being more flexible than the printed circuit board.

15. The connector of claim 14 formed using a flexi-rigid printed circuit board material.

16. The fuel cell stack assembly of claim 1, wherein the array of tabs includes a first row of tabs separated in the y-direction from a second row of tabs.

17. The fuel cell stack assembly of claim 16, wherein eat tab in the array of tabs includes a hook extending in the y-direction, each hook in the first row of tabs extending in a first y-direction, and each hook in the second row of tabs extending in a second y-direction opposite the first y-direction.

18. The fuel cell stack assembly of claim 1, wherein each tab includes a hook disposed at a distal end thereof.

19. The fuel cell stack assembly of claim 1, wherein each tab is approximately 0.1 mm thick or less.

* * * * *